July 10, 1962  R. H. SCOTT  3,043,358
VEHICLE WHEEL RIM
Filed Feb. 23, 1960  2 Sheets-Sheet 1

INVENTOR.
Robert H. Scott
BY
G. E. McGlynn Jr.
ATTORNEY

July 10, 1962 R. H. SCOTT 3,043,358
VEHICLE WHEEL RIM
Filed Feb. 23, 1960 2 Sheets-Sheet 2

INVENTOR.
Robert H. Scott
BY
ATTORNEY

United States Patent Office 3,043,358
Patented July 10, 1962

3,043,358
VEHICLE WHEEL RIM
Robert H. Scott, Wickliffe, Ohio, assignor to General Motors Corporation, Detroit, Mich., a corporation of Delaware
Filed Feb. 23, 1960, Ser. No. 10,276
9 Claims. (Cl. 152—410)

This invention pertains to a multiple piece vehicle wheel rim construction of the type used with heavy duty off-the-highway vehicles and, more particularly, to such a rim construction particularly adapted for use with tubeless tires and which will more effectively transmit loads to the wheel rim base thereby substantially eliminating severe stress concentrations heretofore experienced.

With the advent of tubeless tires for use in heavy duty equipment applications, a new type of rim construction was required in order to facilitate tire installation and removal. In this regard, the tires in question are extremely large and include heavily reinforced, heavy duty materials; as a matter of fact, such tires are practically inflexible without using special tools. In particular, the beads of such tires are so rigid that multiple piece wheel rim constructions were evolved in order to provide the necessary clearances for slipping the tubeless tire beads axially on and off the rim base during the installation and removal procedures.

Such multiple piece wheel rim constructions typically comprise an annular rim base having an annular gutter or gutter section, an annular bead seat band adapted to be removably installed around the rim base, an annular lock ring removably receiveable in the aforementioned gutter and engageable with the bead seat band, and a lock ring driver suitably secured to the lock ring and suitably engaged with the rim base and the bead seat band for the purpose of transmitting torque loads therebetween. A typical example of such a construction may be seen in the U.S. Patent 2,900,006 granted to H. J. Lafaye on August 18, 1959.

As will be obvious, such heavy duty vehicle wheels are subjected to extreme static, torque and other dynamic loadings during operation of the vehicle. Moreover, according to prior art practice, the resultant of a majority of these forces has been passed to the wheel rim base indirectly and at approximately a 45 degree angle to the wheel axis; that is, they have been passed through opposed oblique load-transmitting faces on the band and lock ring to the gutter section of the rim base. As a result, sever stress concentrations occur in the gutter section of the rim base. Such stress concentrations are extremely aggravated due to the tolerances employed in manufacturing the rim base, lock ring and bead seat band. In other words, due to the annular clearances which exist between these parts to facilitate assembly and disassembly, there is load-transmitting engagement throughout only a relatively small portion of the circumferential extent of the wheel assembly at any given position of the latter. It is not unknown for these stress concentrations to result in complete fracturing of the rim base and other components of the rim structure resulting in flying fragments from the rim fatally injuring bystanders.

It is, therefore, a principal object and feature of this invention to provide an improved multiple piece vehicle rim construction in which the aforementioned severe stress concentrations are eliminated, thereby resulting in increased safety and reduced rim base sections particularly in the gutter portion thereof.

It is yet another object and feature of this invention to provide a multiple piece wheel rim construction in which the bead seat band, to which loads are directly transmitted from the tire, is enabled to pass such loads or the resultant of a majority thereof directly to the rim base without passing through the lock ring seated in the gutter section thereof.

In general, these and other objects of the invention are attained in a multiple piece wheel rim construction of the type aforementioned in which the various wheel components are so constructed and arranged that radially oppositely disposed seating or load-transmitting surfaces on the bead seat band and rim base axially inwardly of the gutter section are mutually directly engageable with each other to transmit certain forces, or the resultant of certain forces, directly between the bead seat band and the rim base axially inwardly of the gutter section.

A more complete understanding of the invention will be facilitated from a consideration of the drawings in which.

Figure 1:
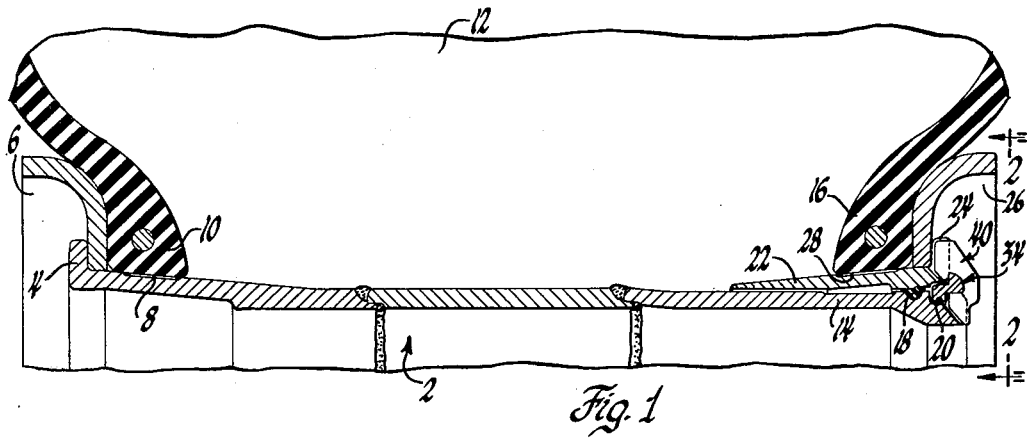
FIGURE 1 is a fragmentary axial section through a vehicle wheel rim utilizing a preferred embodiment of the invention.
Figure 2:
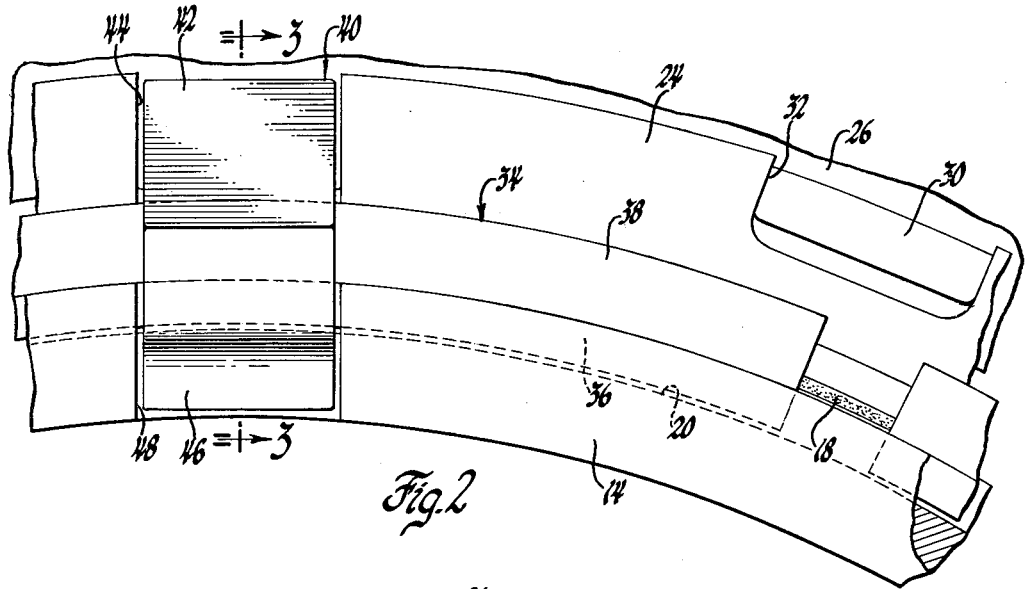
FIGURE 2 is an enlarged fragmentary view taken on line 2—2 of FIGURE 1.

Referring now to FIGURES 1 through 4 inclusive, and one preferred embodiment of the invention, there is shown a multi-piece vehicle wheel rim construction comprising an annular axially extending rim base 2 which may be composed of a plurality of annular sections rigidly joined together to form a rigid construction. At one end of the rim base, there is formed integral therewith an annular substantially radially outwardly extending flange 4 adapted to locate and retain the main annular rim flange 6 which is adapted to be telescopically received upon the rim base from the other end thereof. The left end of the rim base adjacent the main flange 6 includes a plurality of circumferentially spaced, axial serrations 8 against which the bead 10 of the tubeless tire 12 is adapted to seat once the latter is slipped axially upon the rim base from the opposite end thereof. These serrations are arranged in the same manner as those to be described with respect to the bead seat band at the opposite end of the rim base.

The opposite end of the rim base in the portion indicated generally at 14 is axially and radially inwardly tapered in accordance with conventional practice in order to insure that the tire bead 10 and the other opposite bead 16 may be readily insertable upon and removed from the rim base. This portion of the rim base includes an annular groove or seat for an O-ring seal 18 and, axially outwardly therefrom, an annular radially inwardly recessed gutter or gutter section 20 adapted to receive an annular split lock ring to be described.

After the tubeless tire has been inserted upon the rim base 2, the annular axially extending bead seat band 22 is removably mounted about the rim base in sealing engagement with seal 18 and includes a generally radially extending annular flange 24 retaining the other main rim flange 26. The band is mounted about the rim base portion 14 so as to overlie a substantial axial portion thereof, while the band flange 24 is generally radially outwardly opposite the gutter section 20 of the rim base. As previously mentioned, there are a plurality of axially extending circumferentially spaced serrations 28 on the bead seat band to insure firm driving engagement between the latter and the bead 16. The rim flange 26 includes an axially outwardly projecting lug or driver 30 seated within a corresponding notch 32 on the periphery of the band flange 24.

After the bead seat band 22 and rim flange 26 are in position, the annular split lock ring 34, including base portion 36 and radial flange 38, is positioned on the rim assembly. More particularly, the base portion 36 of the lock ring is seated within the gutter 20, while the flange 38 axially engages the band flange 24 to retain the band in its proper position axially of the rim base. The well known lock ring driver 40 is suitably rigidly secured to lock ring 34 and includes an outer lug 42 seated in a notch 44 in the band flange 24, and an inner lug 46 seated in a similar notch 48 at the axial outer extremity of the rim base 14. As a consequence of this construction, the tire 12 is operatively drivingly engaged with the rim base 14.

Figure 3:
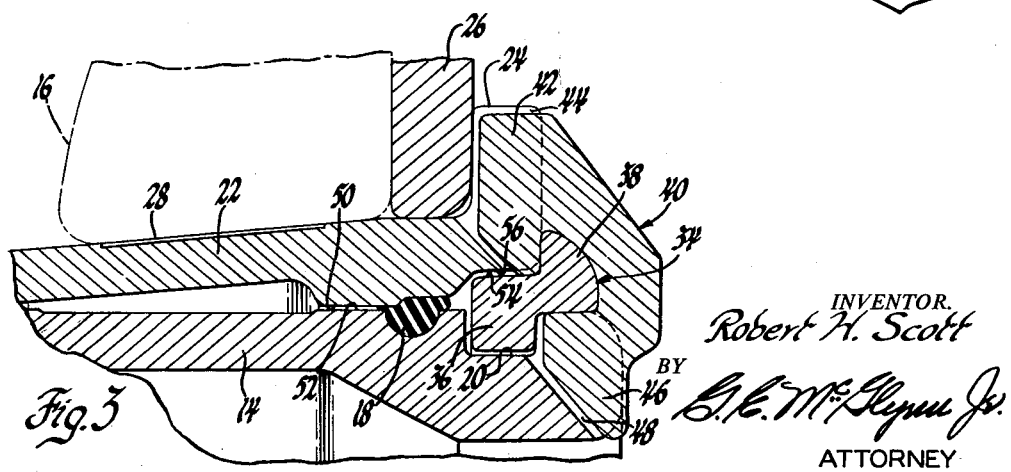
FIGURE 3 is a view taken on line 3—3 of FIGURE 2.
Figure 4:
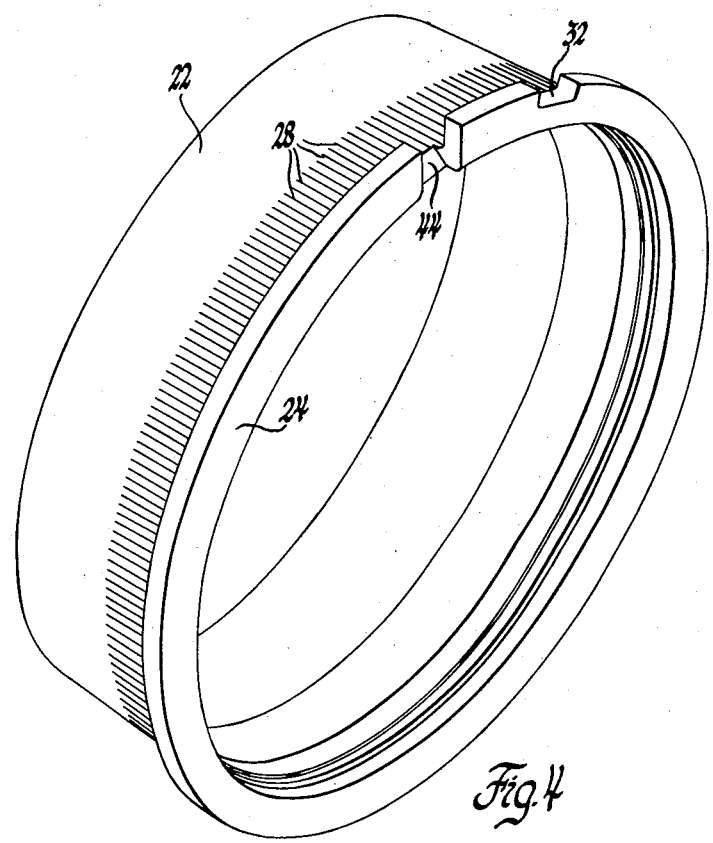
FIGURE 4 is a perspective view of a bead seat band.

Referring particularly to FIGURE 3, it should be noted that the base portion 36 and radial flange 38 of the lock ring firmly nest against the outer portion or shoulder of the rim base just axially outwardly of the gutter 20. The band flange 24 and lock ring flange 38 are axially engageable to retain the bead seat bnd in position, while the reltive configurations of the lock ring 34 and rim base portion 16 and the bead seat band 22 are such as to insure ease of assembly and disassembly, and to insure that the band may seat directly upon the rim base axially inwardly of the gutter section 20 so as to transmit a substantial portion if not all loads or the resultant thereof directly to the rim base rather than through the lock ring 34. To this end, the bead seat band 22 and rim base portion 14 are provided with radially oppositely disposed mutually engageable annular seating surfaces 50 and 52, respectively, the clearance between which is less than that between the upper surface 54 of the base portion 36 of the lock ring driver and the opposed portion 56 of the bead seat band or, more specifically, the flange 24 thereof.

As alluded to previously, in the prior art as in the present construction, the relative diameters of the rim base portion 14, bead seat band 22 and lock ring 34 are so selected as to insure adequate clearance therebetween for assembly and disassembly purposes. The tolerances employed have the effect that the inner diameters of inner surfaces on band 22 are relatively greater than the outside diameters of the opposing surfaces on the rim base portion 14. Consequently, only a small portion of the circumferential extent of the opposed surfaces on the rim base and bead seat band will engage at any given wheel position. Accordingly, when the various loads to which the wheel is subjected occur in the section indicated in FIGURE 3, the clearance between the lock ring 34 and bead seat band 22 at the surfaces 54 and 56 insures that the seating surfaces 50 and 52 will directly mutually engage thereby transmitting a majority of the forces imposed on the construction, or the resultant thereof, directly to the rim base axially inwardly of gutter section 20 thereby avoiding stress concentrations in the latter.

Figure 5:
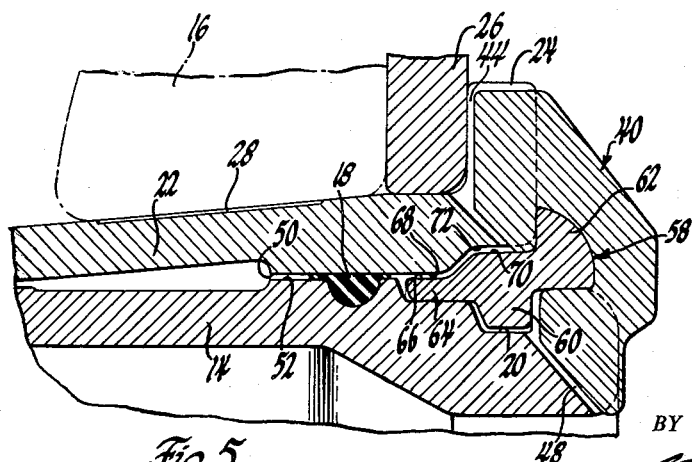
FIGURE 5 is a sectional view generally similar to FIGURE 3, but illustrating another embodiment of the present invention.

Referring to the second embodiment of the invention as disclosed in FIGURE 5, like numerals have been employed to indicate parts corresponding to those previously described. In this embodiment, the lock ring 58 again includes a base portion 60 and flange portion 62. However, the base portion 60 further includes an axially inwardly directed annular extension 64 snugly received upon the rim base, and having an annular seating surface 66 radially oppositely disposed from a similar surface 68 on the bead seat band. The surfaces 66 and 68 are spaced from each other substantially the same distance as the seating surfaces 50 and 52, and which distance is less than the distance between the upper surface 70 of the split ring base portion 60 and the oppositely disposed surface portion 72 of the bead seat band. Thus, according to this embodiment of the invention, the bead seat band will sit down upon the rim base to transmit loads directly thereto not only in the area of the mutually engageable seating surfaces 50 and 52 but also in the area of the seating surfaces 66 and 68, thereby giving further areas for direct load transmission between the bead seat band and the rim base inwardly of gutter section 20.

In prior constructions, fragmentation and failure of the rim assembly have been caused by the resultant of various static, torque and other dynamic loadings being passed obliquely relative to the axis of the wheel assembly and indirectly through the lock ring to the gutter section of the rim base. It will be readily apparent that, according to the teaching of either embodiment of the invention as hereindisclosed, the radial flange of the respective lock rings will be axially engageable with the flange 24 of the bead seat band to resist any side thrust imposed thereon, while the lock rings permit the bead seat band to sit directly upon the rim base for direct load transmission therebetween. Accordingly, high stress concentrations in the area of the gutter section 20 are avoided thereby resulting in a safer construction, and one which does not require as much material in the gutter section of the rim base.

While but two embodiments of the invention have been selected for a descriptive illustration thereof, other forms will become apparent to those skilled in the art. Therefore, the embodiments shown in the drawings are merely for illustrative purposes, and are not intended to limit the scope of the invention which is defined by the claims which follow.

I claim:

1. A multiple piece vehicle wheel rim for mounting a tire thereon comprising an annular rim base having a radially inwardly recessed annular gutter in an axially outer portion thereof, an annular rigid bead seat band removably mounted about said rim base and including an axially outer portion radially outwardly spaced from said gutter, an annular lock ring seated in said gutter to retain said band on said rim base and including a portion radially inwardly spaced from said portion of said band, and radially opposed mutually engageable seats on said band and rim base axially inwardly from said gutter, the clearance between said portions of said band and said lock ring being greater than that between said seats so that the latter engage before engagement of said portions to transmit certain of the forces imposed on said band directly to said rim base through said seats.

2. A multiple piece vehicle wheel rim for mounting a tire thereon comprising an annular rim base having a gutter in an axially outer portion thereof, an annular rigid bead seat band removably mountable about said rim base and including an axially outer portion radially outwardly spaced from said gutter, an annular lock ring seated within said gutter to retain said band on said rim base and including a portion radially inwardly spaced from said portion of said band, and means drivingly connecting said band and rim base, said band and rim base being directly engageable axially inwardly from said gutter, the clearance between said portions of said band and lock ring being greater than that between said band and rim base so that the latter engage before engagement of said portions to transmit certain forces imposed on said band directly to said rim base.

3. A multiple piece vehicle wheel rim for mounting a tire thereon comprising an annular rim base having a radially inwardly recessed gutter in an axially outer portion thereof, an annular rigid bead seat band removably mountable about said rim base and including a radially outwardly extending annular flange at an axially outward portion thereof substantially opposite said gutter, an annular lock ring having a base portion seated within said gutter and radially inwardly spaced from said portion of said band and a radially outwardly directed annular flange axially engageable with said band flange, and means drivingly connecting said ring to said band and rim base, said band and rim base being directly engageable axially inwardly from said gutter, the clearance between said portions of said band and lock ring being greater than that between said band and rim base so that the latter engage before engagement of said portions to transmit certain forces imposed on said band directly radially to said rim base.

4. A multiple piece vehicle wheel rim for mounting a tire thereon comprising an annular rim base having a radially inwardly recessed annular gutter in an axially outer portion thereof, an annular rigid bead seat band removably mounted about said rim base and including an axially outer portion radially outwardly spaced from said gutter, an annular lock ring seated in said gutter to retain said band on said rim base and including a portion radially inwardly spaced from said portion of said band, and radially opposed mutually engageable seats on said band and rim base axially inwardly from said gutter, the clearance between said portions of said band and lock ring being greater than that between said seats so that the latter engage before engagement of said portions to transmit the resultant of a majority of the forces imposed on said band directly to said rim base through said seats.

5. A multiple piece vehicle wheel rim for mounting a tire thereon comprising an annular rim base having a radially inwardly recessed gutter in an axially outer portion thereof, an annular rigid bead seat band removably mountable about said rim base and including a radially outwardly extending annular flange at an axially outward portion thereof substantially opposite said gutter, an annular lock ring having a base portion seated within said gutter and radially inwardly spaced from said portion of said band and a radially outwardly directed annular flange axially engageable with said band flange, and means drivingly connecting said ring to said band and rim base, said band and rim base being directly engageable axially inwardly from said gutter, the clearance between said portions of said band and lock ring being greater than that between said band and rim base so that the latter engage before engagement of said portions to transmit the resultant of a majority of the forces imposed on said band directly radially to said rim base axially inwardly of said gutter.

6. A multiple piece vehicle wheel rim for mounting tubeless tires thereon comprising an annular rim base having a gutter in an axially outer portion thereof, an annular seating means on said rim base axially inwardly of said gutter, an annular rigid bead seat band mounted around said rim base and including an annular seating means radially opposite from said first-named seating means and an axially outer portion radially outwardly spaced from said gutter, an annular lock ring seated within said gutter and including a portion radially inwardly spaced from said portion of said band, and means drivingly connecting said band and rim base, said seating means being directly engageable to transfer loads imposed on said band directly radially to said rim base axially inwardly of said gutter, the clearance between said seating means being less than that between said portions of said band and said lock ring so that the latter are out of engagement upon engagement of said seating means.

7. The wheel rim as defined in claim 6 in which the lock ring further includes an annular axially inwardly extending portion disposed axially inwardly from said gutter between said rim base and band, and radially oppositely disposed seating means on said ring portion and band which are mutually engageable to transmit additional loads directly radially from said band to said rim base axially inwardly from said gutter, the clearance between said last-named seating means being less than that between said first-named portions of said band and lock ring so that the latter are out of engagement upon engagement of said last-named seating means.

8. A multiple piece vehicle wheel rim for mounting tubeless tires thereon comprising an annular rim base having a gutter in an axially outer portion thereof, an annular seating means on said rim base axially inwardly of said gutter, an annular rigid bead seat band mounted round said rim base and including a radially outwardly extending flange at an axially outer portion thereof substantially radially opposite from said gutter and an annular seating means radially opposite said first-named seating means, and an annular lock ring hving a base portion seated within said gutter and radially inwardly spaced from said portion of said band and a radially outwardly extending annular flange axially engageable with said flange of said band to restrict axially outward movement of the latter on said rim base, said seating means being directly engageable to transfer loads imposed on said band directly radially to said rim base axially inwardly of said gutter, the clearance between said seating means being less than that between said portions of said band and lock ring so that the latter are out of engagement upon engagement of said seating means.

9. The wheel rim as defined in claim 8 in which the base portion of the lock ring further includes an annular axially inwardly extending portion disposed axially inwardly from said gutter between said rim base and band, and radially oppositely disposed seating means on said axially extending ring base portion and band which are mutually engageable to transmit additional loads directly radially from said band to said rim base axially inwardly from said gutter, the clearance between said last-named seating means being less than that between said first-named portions of said band and lock ring so that the latter are out of engagement upon engagement of said last-named seating means.

References Cited in the file of this patent

UNITED STATES PATENTS

| | | |
|---|---|---|
| 2,822,017 | Herzegh | Feb. 4, 1958 |
| 2,894,556 | Darrow | July 14, 1959 |
| 2,900,006 | La Faye | Aug. 18, 1959 |
| 2,922,457 | Hrdlicka | Jan. 26, 1960 |

FOREIGN PATENTS

| | | |
|---|---|---|
| 747,782 | Great Britain | Apr. 11, 1956 |